United States Patent Office 3,840,645
Patented Oct. 8, 1974

3,840,645
METHOD OF INCREASING THE STABILITY OF PARTIALLY SOLVATED ALUMINUM-CONTAINING HYDRIDES
Arthur P. Demers, Beverly, and David W. Rudd, Saugus, Mass., assignors to Metal Hydrides Incorporated, Beverly, Mass.
No Drawing. Filed Sept. 24, 1962, Ser. No. 227,110
Int. Cl. C01b 1/00
U.S. Cl. 423—275                    13 Claims

ABSTRACT OF THE DISCLOSURE

A method for increasing the stability of solvated, polymeric aluminum-containing hydrides comprising mixing mercury or a mercury halide with the hydride.

---

This invention relates to methods for increasing the stability of polymeric aluminum-containing compositions, such as aluminum hydride and compositions conforming substantially to the formula $M(Al_xH_{3x+1})_y$ where M is a metal selected from alkali metals and alkaline earth metals, $x$ is a number greater than 1, and $y$ is a number designating the valence of the metal M.

The U.S. Pat. No. 2,567,972 to H. I. Schlesinger and A. E. Finholt describes a method for preparing alkali metal and alkaline earth metal aluminum hydrides. The method comprises reacting an alkali metal hydride or an alkaline earth metal hydride with an aluminum halide in an ether medium. The reaction is illustrated by the equation:

$$4LiH + AlCl_3 \rightarrow LiAlH_4 + 3LiCl \qquad (1)$$

The reaction mixture consists of a solution of the alkali metal aluminum hydride in the ether containing precipitated lithium halide. The precipitated lithium halide is removed by filtration and the filtrate evaporated to recover solid alkali metal aluminum hydride free of ether.

Also, as described in the above patent, aluminum hydride may be prepared by reacting an aluminum halide with either a metal hydride or a metal aluminum hydride in an ether medium where said metal is an alkali metal or an alkaline earth metal. The reactions are illustrated by the equations:

$$3LiH + AlCl_3 \rightarrow 3LiCl + AlH_3 \qquad (2)$$

$$3LiAlH_4 + AlCl_3 \rightarrow 3LiCl + 4AlH_3 \qquad (3)$$

The reaction mixtures obtained by the reactions illustrated by equations (2) and (3) are solutions of aluminum hydride in the ether containing precipitated lithium halide. When these reaction mixtures are filtered to remove the lithium halide and the filtrates evaporated, the resulting solid products have a composition approximating the formula $2AlH_3 \cdot O(C_2H_5)_2$. If the solid is heated at 90° C. in vacuo for several hours, the composition may reach proportions corresponding to $6AlH_3 \cdot O(C_2H_5)_2$. Both the solvated and partially desolvated materials are thermally unstable.

A method for preparing a composition which approximates the structure of aluminum hydride, and from which the bonded solvent may be more completely removed, is described in the copending application of Arthur P. Demers and Sidney Johnson, Ser. No. 139,622, filed Sept. 21, 1961, now abandoned. The compositions prepared by this method conform substantially to the formula $$LiAl_xH_{3x+1} \cdot Z$$

where $x$ is a number greater than 1, and Z is a number representing the number of moles of solvent in the solvate. As $x$ is increased the percentages by weight of aluminum and hydrogen approach those of solvated aluminum hydride. Consequently, compositions may be prepared by this method which are essentially solvated aluminum hydride containing small amounts of a metal. This method comprises reacting lithium aluminum hydride with an aluminum halide in molar proportions greater than three moles of lithium aluminum hydride for each mole of the aluminum halide in an ether reaction medium. In the preferred method, the stoichiometric amounts of lithium aluminum hydride and aluminum halide required to produce the desired amount of the desired composition are calculated from the equation illustrating the reaction for producing the desired composition. For example, if the composition desired is $LiAl_{25}H_{76}$ the following equation is illustrative of the reaction:

$$76LiAlH_4 + 24AlCl_3 \rightarrow 4LiAl_{25}H_{76} + 72LiCl$$

The calculated amount of lithium aluminum hydride dissolved in a solvent, such as diethyl ether, is added to a reaction flask equipped with a reflux condenser, stirrer and dropping funnel, the flask having been flushed with nitrogen. The contents of the flask are stirred constantly while rapidly adding the calculated amount of aluminum halide, preferably as a solution, but at a rate to maintain a controllable reaction. When all the aluminum halide has been added, the reaction mixture is stirred vigorously for a short time sufficient to ensure adequate mixing of the reactants. The reaction mixture then is filtered to remove the precipitated lithium halide. The free unbonded solvent ether is removed from the filtrate as quickly as possible after filtration, preferably by placing the solution under vacuum.

The above co-pending application also describes a method for removing substantially all of the bonded solvent from the solvates to form compositions conforming substantially to the formula $LiAl_xH_{3x+1} \cdot Z$. Thus, after removal of the free solvent, the product is permitted to stand about 18 hours, preferably under vacuum and at room temperature, before applying sufficient heat to remove bonded solvent. The product then is heated under vacuum to a temperature that will effect liberation of the bonded solvent without decomposing the product. The temperature required varies between about 70° C. and about 95° C. and is maintained until vapor ceases to be evolved. In some instances a temperature as high as 108° C. may be used.

In preparing the solvated composition represented by the formula $LiAl_xH_{3x+1} \cdot Z$ it is preferred to use aluminum chloride but other aluminum halides may be used, such as the bromide, iodide or fluoride. In place of diethyl ether other liquid ethers may be used, such as dibutyl ether, dioxane and tetrahydrofuran. In place of lithium aluminum hydride other alkali metal aluminum hydrides or the alkaline earth metal aluminum hydrides may be used to form compositions conforming to the formula $M(Al_xH_{3x+1})_y \cdot Z$ where M is a metal selected from alkali metals and alkaline earth metals, $x$ is a number greater than 1, $y$ is a number designating the valence of the metal M, and Z is a number representing the number of moles of solvent in the solvate. These compositions also may be prepared by reacting an alkali metal hydride, such as lithium hydride or sodium hydride, or an alkaline earth metal hydride, such as calcium hydride, with an aluminum halide in suitable proportions in an ether medium.

The compositions formed by heating the compositions conforming to the formula $M(Al_xH_{3x+1})_y \cdot Z$ to remove substantially all of the bonded solvent as above described are thermally unstable. As illustrative, an aluminohydride prepared as illustroted by the equation.

$$10AlCl_3 + 34LiAlH_4 \rightarrow 4LiAl_{11}H_{34} + 30LiCl$$

had an active hydrogen content of 9.50 percent by weight a few days after its preparation and desolvation. After standing for 20 days, in a tightly capped jar at ambient temperature, its active hydrogen content had dropped to 9.11 percent; after standing for 36 days, its active hydrogen content was 6.99 percent; and after 56 days, the active hydrogen content was 3.84 percent by weight. The stability is greater when stored in a cold atmosphere. Thus, a sample of the batch of material, kept in a tightly sealed jar in a refrigerator at about 0° C., showed an active hydrogen content of 8.99 percent by weight after 56 days.

Samples of various preparations with widely varying compositions have been tested for stability at 50° C. and 75° C. In general, at 50° C. the compositions exhibit a fair degree of thermal stability for 20 to 60 hours before an extremely rapid autocatalytic decomposition becomes evident, resulting in up to 5 percent or more decomposition after 100 hours with the rate of further decomposition rapidly increasing with time. At 75° C. the rate of decomposition is extremely rapid, the material being as much as 6 percent decomposed after 3 hours with little or no apparent preliminary short induction period of relative stability before the extremely rapid decomposition becomes evident.

The aluminum hydride prepared by the method described in the above referred to Pat. No. 2,567,972 is a polymeric material having the empirical formula $AlH_3$. Like all polymers, it is made up of regularly recurring units which have the same pattern of structural bonding throughout except at terminal positions of the copolymer. Similarly, the compositions prepared as described in the above mentioned co-pending application of Demers and Johnson are polymeric compositions having recurring aluminum-hydrogen linkages and, when desolvated, may be represented by the formula $M(Al_xH_{3x+1})_y$. The terminal valences of these polymeric aluminum-containing compositions may be satisfied by an anion, such as $H^-$, $AlH_4^-$ or $BH_4^-$, or by a group such as $OR_2$, $NR_3$, $OR^-$, $NR_2^-$, $Cl^-$, etc.

The present invention is based upon our discovery that the stability at ambient and elevated temperatures of polymeric aluminum-containing hydride compositions, either in solvated or desolvated form, can be markedly increased by associating the composition with certain materials. We have found metallic mercury, mercurous and mercuric halides, such as the chloride, bromide, iodide or fluorides; as well as aluminum halides, such as the chloride, bromide, iodide or fluoride, suitable for this purpose.

The invention is illustrated further by the following specific examples.

EXAMPLE I

A composition represented by the formula $LiAl_6H_{19}$ was prepared by reacting lithium aluminum hydride and aluminum chloride in diethyl ether and the product was desolvated to remove substantially all the bonded solvent. 0.374 grams of mercuric chloride powder was well mixed with 10 grams of the desolvated product. A 0.525 gram sample of the mixture was placed in a tube and the tube attached to a mercury filled open-end manometer so that any gas liberated from the sample would displace the mercury in the manometer and indicate the pressure built up. The tube was immersed in an oil bath maintained at 50° C. to accelerate the decomposition, the manometer being maintained at ambient temperature. At the same time 0.748 grams of the same desolvated product was placed in another tube and the tube attached to a mercury filled open-end manometer, the tube being immersed in an oil bath maintained at 50° C. while the manometer was maintained at ambient temperature. The sample without mercuric chloride was 2 percent decomposed at the end of 25 hours. The sample containing the mercuric chloride required 120 hours to become 2 percent decomposed.

EXAMPLE II

A composition represented by the formula $LiAl_{11}H_{34}$ was prepared by the procedure described in Example I and the product was desolvated. A 0.3734 gram sample of the desolvated product was tested for stability at 50° C. using an open-end manometer as described in Example I. After 30 hours the material was 3 percent decomposed and its rate of decomposition was proceeding rapidly. At the same time a 0.3997 gram sample of the desolvated product was placed in a tube and the tube attached to a modified type of manometer so that the mercury within the manometer was maintained at 50° C. as well as the tube. The tube and manometer were evacuated and conditions arranged so that the mercury vapor could diffuse through the evacuated system and be in constant contact with the sample. At the end of 100 hours the desolvated product was only 1.75 percent decomposed and its rate of decomposition after that time was almost negligible.

EXAMPLE III

A composition represented by the formula $LiAl_8H_{25}$ was prepared by reacting lithium aluminum hydride in diethyl ether and the reaction mixture filtered. To the filtrate an amount of an ether solution of mercuric chloride was added sufficient to have about 1 percent by weight mercuric chloride based upon the theoretical weight of the desolvated product. An immediate black precipitate formed which was presumed to be colloidal mercury. The free solvent was stripped from the mixture and about one-half of the dry solvated product removed and desolvated at 80° C. for 65 minutes. A 0.3329 gram sample of the desolvated product was placed in a glass tube and the tube attached to an open-end manometer, the tube being maintained at 50° C. and the manometer being maintained at ambient temperature. At the end of 100 days at 50° C. the material showed only 2.10 percent decomposition and a negligible rate of decomposition thereafter.

EXAMPLE IV

A composition represented by the formula $LiAl_{11}H_{34}$ was prepared in diethyl ether and desolvated. To part of the desolvated product, an amount of aluminum chloride was added equal to 2.5 percent by weight of the product, the aluminum chloride being well mixed with the product. A stability test at 50° C. was made on both the material with the aluminum chloride and without it. The material without the aluminum chloride showed 4.9 percent decomposition after 10 hours. The material containing the aluminum chloride showed 4.85 percent decomposition at the end of 23 hours.

We claim:

1. The method for increasing the stability of solvated polymeric hydrides consisting, essentially of a plurality of recurring aluminum-hydrogen linkages which comprises mixing the polymeric hydride with a material selected from the group consisting of mercury, a mercurous halide, and a mercuric halide.

2. The method as claimed by claim 1 wherein a substantial amount of the bonded solvent has been removed from the polymeric aluminum-containing hydride.

3. The method as claimed by claim 1 wherein the solvated polymeric aluminum-containing hydride is aluminum hydride.

4. The method as claimed by claim 1 wherein the solvated polymeric aluminum-containing hydride conforms substantially to the formula $M(Al_xH_{3x+1})_y \cdot Z$ where M is a metal selected from alkali metals and alkaline earth metals, $x$ is a number greater than 1, $y$ is a number designating the valence of the metal M, and Z is a number representing the number of moles of bonded solvent in the solvate.

5. The method as claimed by claim 1 wherein the solvated polymeric aluminum-containing hydride conforms substantially to the formula $LiAl_xH_{3x+1} \cdot Z$ where $x$ is a number greater than 1, and Z is a number representing the number of moles of bonded solvent in the solvate.

6. The method as claimed by claim 3 wherein a substantial amount of the bonded solvent has been removed from the aluminum hydride.

7. The method as claimed by claim 4 wherein a substantial amount of the bonded solvent has been removed from the aluminum-containing hydride.

8. The method as claimed by claim 5 wherein a substantial amount of the bonded solvent is removed from the aluminum-containing hydride.

9. The method as claimed by claim 7 wherein the selected material is metallic mercury.

10. The method as claimed by claim 7 wherein the selected material is mercuric chloride.

11. The method as claimed by claim 8 wherein $x$ is a number not greater than 25.

12. The method as claimed by claim 11 wherein the selected material is metallic mercury.

13. The method as claimed by claim 11 wherein the selected material is mercuric chloride.

References Cited

UNITED STATES PATENTS 2,567,972   9/1951   Schlesinger _____ 23—4

FOREIGN PATENTS 893,338   10/1953   Germany.
893,339   10/1953   Germany.

CARL D. QUARFORTH, Primary Examiner

R. L. TATE, Assistant Examiner

U.S. Cl. X.R.

423—644